United States Patent
Hu

(10) Patent No.: US 11,120,285 B2
(45) Date of Patent: *Sep. 14, 2021

(54) INTELLIGENT TERMINAL

(71) Applicant: BEIJING TAITAN TECHNOLOGY CO., LTD., Beijing (CN)

(72) Inventor: Guohui Hu, Shenzhen (CN)

(73) Assignee: BEIJING TAITAN TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,107

(22) Filed: Dec. 31, 2019

(65) Prior Publication Data

US 2020/0134341 A1    Apr. 30, 2020

(30) Foreign Application Priority Data

Dec. 28, 2019   (CN) .......................... 201911385201.7

(51) Int. Cl.
*G06K 9/00*    (2006.01)
*G06F 21/32*   (2013.01)

(52) U.S. Cl.
CPC ......... *G06K 9/00892* (2013.01); *G06F 21/32* (2013.01); *G06K 9/00389* (2013.01); *G06K 2009/00395* (2013.01)

(58) Field of Classification Search
CPC ........... G06K 9/00892; G06K 9/00389; G06K 2009/00395; G06K 9/4604; G06K 9/00375; G06K 9/00355; G06K 9/00006; G06K 2009/00932; G06K 9/00255; G06K 9/00671; G06K 9/627; G06K 9/00281; G06K 9/00604; G06K 9/0061; G06K 9/00617; G06K 9/3233; G06K 9/4628; G06K 9/66; G06K 9/00; G06K 9/6267; G06K 9/00288; G06K 9/00013; G06K 9/00402; G06K 9/34; G06K 7/10722; G06K 19/0614; G06K 7/1413; G06K 9/00026;
(Continued)

(56) References Cited

U.S. PATENT DOCUMENTS

2016/0162671 A1* 6/2016 Baca .................. G06K 9/00892
                                                               382/115
2017/0039357 A1* 2/2017 Hwang ................ G06K 9/6293
(Continued)

*Primary Examiner* — Nimesh Patel

(57) ABSTRACT

Disclosed is an intelligent terminal, for which the startup authentication includes first performing face authentication and continuing to perform gesture-based virtual password authentication after the face authentication, even if the face authentication is cracked, the gesture-based password authentication is required to perform for logging in, and so the intelligent terminal of the disclosure can effectively improve the security of authentication. Further, the gesture-based virtual password authentication is performed based on a gesture image input by a user in the air, so that since there is no need to perform input operations on a screen of the intelligent terminal, the aesthetics of the intelligent terminal will not be affected. Moreover, in the disclosure, when the virtual password is determined by detecting binary images of fingertips, the disturbance of the binary images of the fingertips is also removed, which can improve the probability and efficiency in subsequent detection of the virtual password.

5 Claims, 4 Drawing Sheets

(58) Field of Classification Search
CPC .. G06K 19/06037; G06K 5/02; G06K 9/4652; G06K 9/52; G06K 7/016; G06K 7/10891; G06K 9/00201; G06K 9/036; G06K 9/00046; G06K 2007/10534; G06K 2009/4666; G06F 21/32; G06F 21/44; G06F 21/46; G06F 3/017; G06F 3/013; G06F 3/011; G06F 3/005; G06F 1/163; G06F 21/62; G06F 16/337; G06F 21/31; G06F 21/445; G06F 21/57; G06F 21/575; G06F 21/6245; G06F 2221/2129; G06F 3/0346; G06F 3/0428; G06F 2203/011; G06F 21/53; G06F 2221/2113; G06F 21/64; G06F 2221/2149; G06F 3/04883; G06F 3/016; G06F 3/0488; G06F 3/0425; G06F 3/04815; G06F 3/012; G06F 2203/04808; G06F 3/03547; G06F 21/56; G06F 21/554; G06F 2203/0338; G06F 15/16; G06F 21/42; G06F 3/0421; G06F 3/0484; G06F 9/451; G02B 2027/0178; G02B 27/017; G02B 27/0093; H04L 63/10; H04L 63/08; H04L 63/0861; H04L 63/083; H04L 63/0428; H04L 2463/101; H04L 63/06; H04L 63/061; H04L 63/102; H04L 63/04; H04L 63/0272; H04L 67/306; H04L 9/3231; H04L 63/0853; H04L 63/0876; H04L 63/20; H04L 2209/805; H04L 63/107; H04L 67/30; G06T 19/006; G06T 13/40; G06T 19/20; G06T 1/0007; G06T 7/62; G06T 2207/10028; G06T 7/0004; G06T 17/20; G06T 2207/10024; G06T 2219/012; G06T 11/001; G06T 2200/04; G06T 2200/24; G06T 2207/30168; G06T 7/0002; G06T 7/50; H04W 12/08; H04W 4/025; H04W 12/02; H04W 12/06; H04W 4/026; H04W 4/021; H04W 4/023; H04W 4/027; H04W 12/065; H04W 4/02; H04W 48/04; H04W 4/029; H04W 64/00; H04W 12/12; G07C 9/37; G07C 9/00563; G07C 9/33; G07C 9/00571; G06Q 20/40145; G06Q 20/4016; G06Q 20/308; G06Q 20/40; G06Q 30/0609; G06Q 20/208; G06Q 20/409; A61B 5/1116; A61B 5/6803; A61B 5/7278; A61B 5/7285; A61B 2562/0219; A61B 5/1172; A61B 5/4836; A61B 5/6826; A61B 5/7207; A61B 5/7257

See application file for complete search history.

(56) References Cited

U.S. PATENT DOCUMENTS

| | | | |
|---|---|---|---|
| 2017/0053108 A1* | 2/2017 | Jakobsson | H04L 63/10 |
| 2017/0161750 A1* | 6/2017 | Yao | G06Q 20/40145 |
| 2018/0060683 A1* | 3/2018 | Kontsevich | H04L 63/0861 |

* cited by examiner

INTELLIGENT TERMINAL

TECHNICAL FIELD

The disclosure relates to the technical field of intelligent terminal, in particular, to an intelligent terminal having a startup authentication method with high security.

BACKGROUND

With the development of artificial intelligence, more and more intelligent terminals have begun to be widely used. For example, smart phones, smart watches, computers, tablets, etc. have become necessities for people's daily lives. However, people are increasingly demanding privacy. How to perform secure startup authentication on intelligent terminals is a problem facing the industry. In the prior art, one method is to authenticate with face recognition when the intelligent terminal is powered on, but the existing face recognition is not completely reliable in terms of security, for example, a face established through 3D modeling can also be authenticated. On the other hand, in the prior art, the authentication method for inputting a gesture password on the screen of an intelligent terminal is also adopted, but long-term use of this method will leave fingerprints on the screen of the intelligent terminal and affect the screen aesthetics

SUMMARY

The technical problem to be solved by the disclosure is to provide an intelligent terminal, which on the one hand may improve the security of the startup authentication of intelligent terminal, and on the other hand does not need to perform input operations on the screen of the intelligent terminal so as not to affect the aesthetics of the intelligent terminal.

In order to solve the technical problem, the disclosure adopts the following technical solution:

An intelligent terminal includes:

an initiation processing module, configured to initiate the intelligent terminal for startup;

a face authentication processing module, configured to perform a face authentication on a user;

a gesture image capturing processing module, configured to initiate a user gesture authentication after the face authentication, and capture a gesture image input by the user in the air;

a fingertip binary image extraction processing module, configured to process the captured gesture image of each frame to extract a fingertip binary image corresponding to the frame, wherein the fingertip binary image comprises a black background image block and a white fingertip image block;

a fingertip binary image validity detection processing module, configured to, starting from a fingertip binary image at a starting frame, detect a displacement of the fingertip image block at a current frame with respect to the fingertip image block at a previous frame, determine the fingertip image block at the current frame as a perturbed fingertip binary image when the displacement is less than a predetermined threshold, then continue to detect a displacement of the fingertip image block at a next frame with respect to the fingertip image block at the current frame, determine the fingertip image block at the next frame as the perturbed fingertip binary image when the displacement is less than a predetermined threshold, and then continue to detect the fingertip binary images at subsequent frames until the detection of the fingertip binary image at a last frame is completed, and then remove the perturbed fingertip binary images to finally determine a valid fingertip binary image;

a virtual password determination processing module, configured to generate a fingertip motion trajectory according to coordinates of each fingertip in a valid fingertip binary image, and determine a virtual password corresponding to the fingertip motion trajectory;

an authentication processing module, configured to determine whether the virtual password matches a preset virtual password, and pass the authentication if yes to allow logging in the intelligent terminal.

Compared with the prior art, the disclosure has the following beneficial effects:

In the intelligent terminal of the disclosure, for which the startup authentication includes first performing face authentication and continuing to perform gesture-based virtual password authentication after the face authentication, even if the face authentication is cracked, the gesture-based password authentication is required to perform for logging in, so the intelligent terminal of the disclosure can effectively improve the security of startup authentication. Further, for the intelligent terminal of the disclosure, the gesture-based virtual password authentication is performed based on a gesture image input by a user in the air, so that since there is no need to perform input operations on a screen of the intelligent terminal, the aesthetics of the intelligent terminal will not be affected. Moreover, in the disclosure, when the virtual password is determined by detecting binary images of fingertips, the disturbance of the binary images of the fingertips is also removed, which can improve the probability and efficiency in subsequent detection of the virtual password.

DETAILED DESCRIPTION

Figure 1:
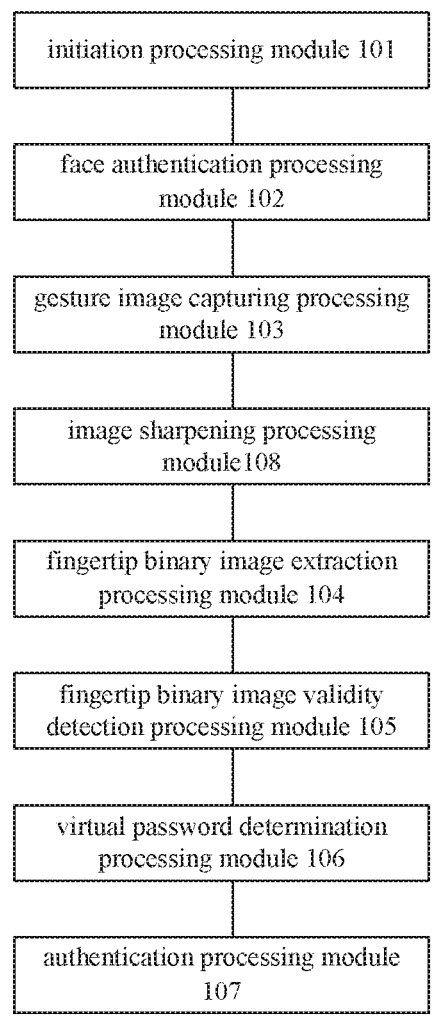
FIG. 1 is a block view of a specific embodiment of an intelligent terminal of the disclosure.
Figure 2:
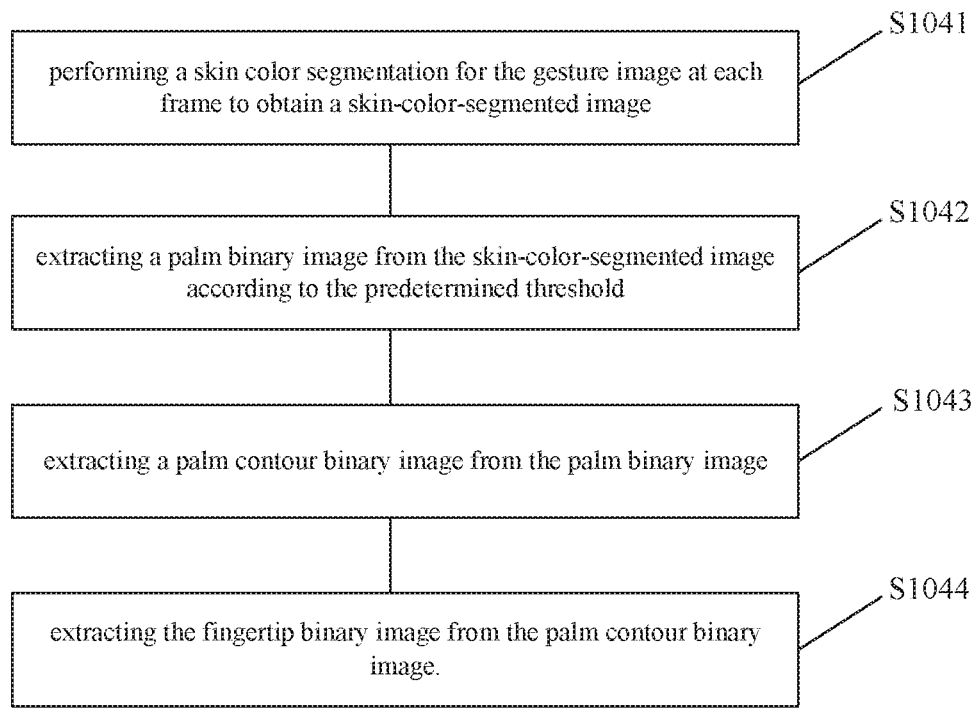
FIG. 2 is a flow chart of a specific embodiment of extracting a fingertip binary image in an intelligent terminal of the disclosure.
Figure 3A:
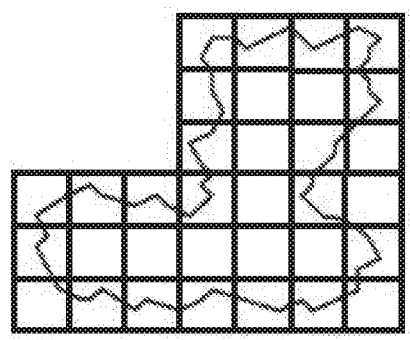
FIGS. 3a to 3b are schematic views of smoothing a palm contour in an intelligent terminal of the disclosure.
Figure 3B:
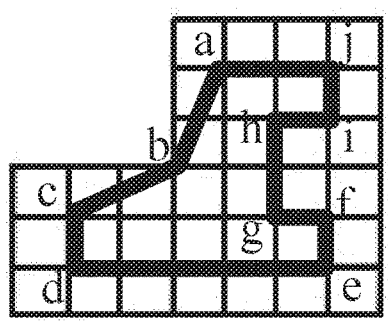
Figure 4A:
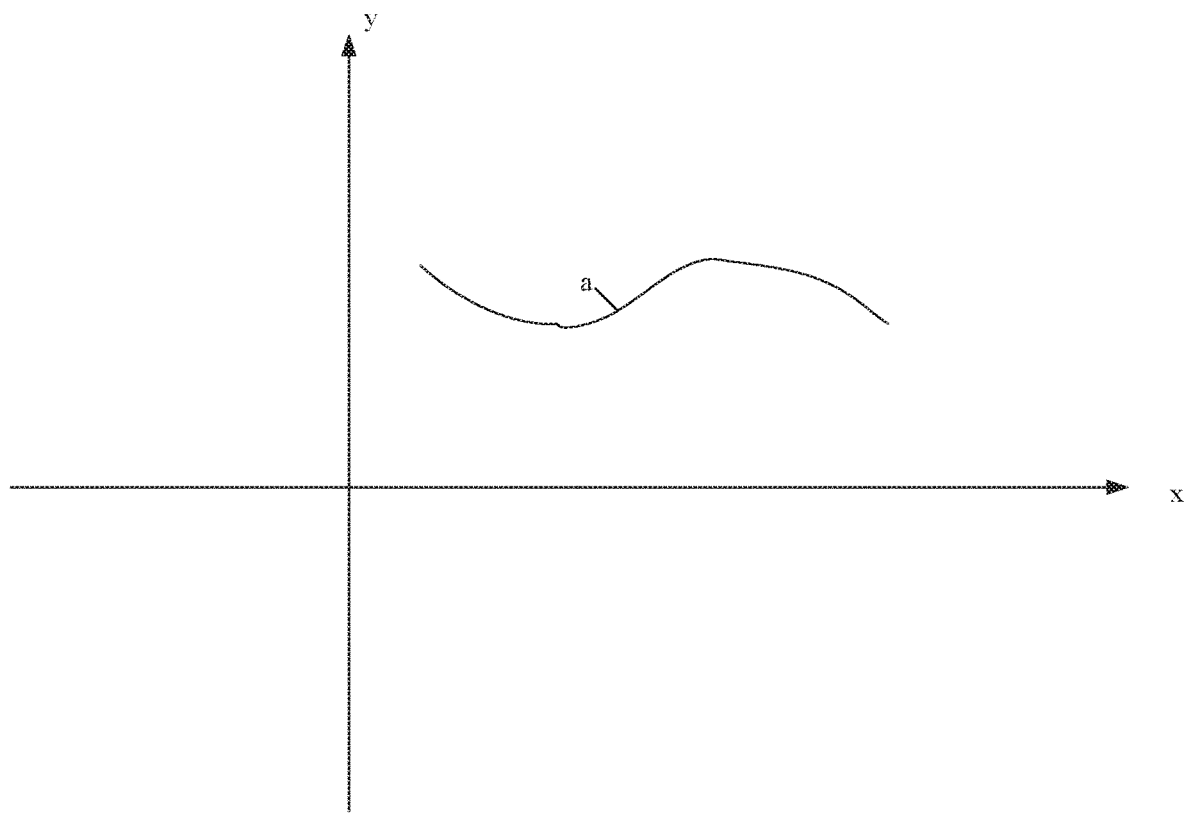
FIGS. 4a to 4b are views showing a motion trajectory of continuous movement and pause of a fingertip in an intelligent terminal of the disclosure.
Figure 4B:
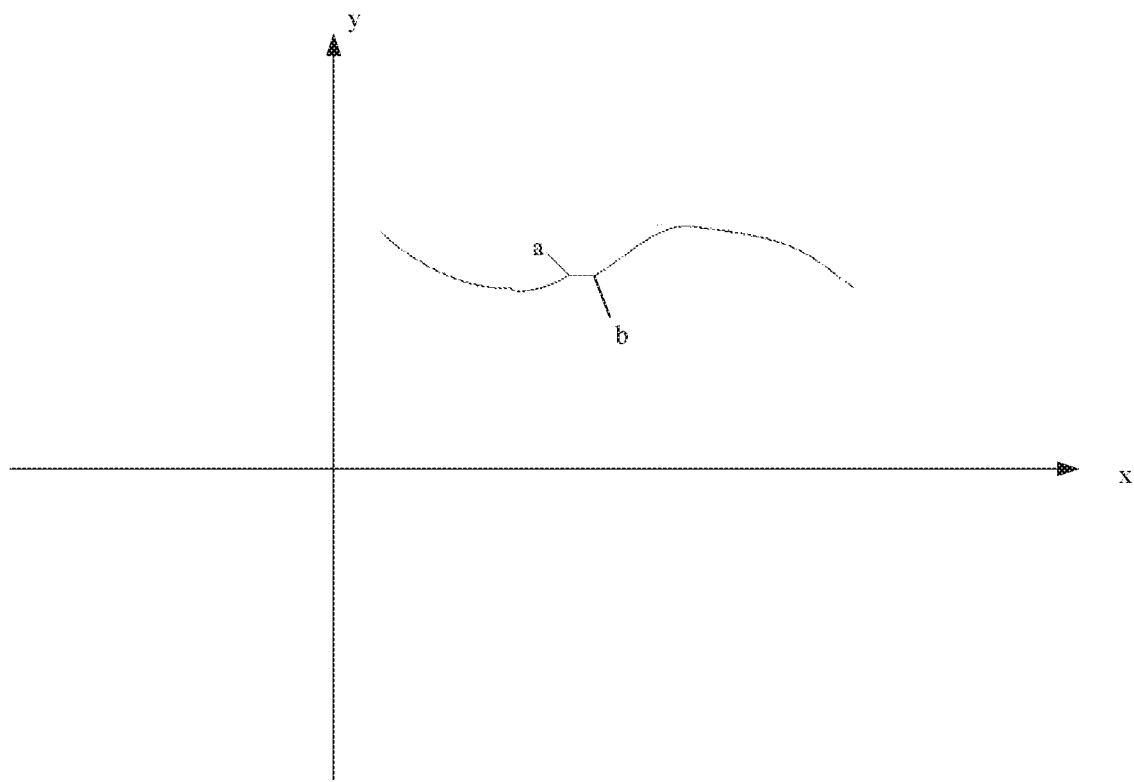

With reference to FIG. 1, a block view of a specific embodiment of an intelligent terminal of the disclosure is illustrated. The intelligent terminal of the disclosure mainly includes an initiation processing module 101, a face authentication processing module 102, a gesture image capturing processing module 103, a fingertip binary image extraction processing module 104, a fingertip binary image validity detection processing module 105, a virtual password determination processing module 106, and an authentication processing module 107, which are specifically described as follows:

for the initiation processing module 101, the initiation processing module 101 in the present embodiment is mainly configured to initiate the intelligent terminal for startup, specifically, for example, when a user triggers a power-on button or a wake-up button, the intelligent terminal may be started, which is not specifically limited here;

for the face authentication processing module 102, the face authentication processing module 102 in the present embodiment is mainly configured to perform a face authentication on a user, specifically, the face authentication is to recognize faces, and in the present embodiment, a face recognition method based on the characteristic face (PCA) may be used for the face authentication, or a face recognition method based on the neural network may also be adopted, wherein details are not described herein;

for the gesture image capturing processing module 103, the gesture image capturing processing module 103 in the present embodiment is mainly configured to initiate a user gesture authentication after the face authentication and capture a gesture image input by the user in the air, specifically, the present embodiment differs from the prior art in that the user will input gestures in the air instead of inputting through the screen of the intelligent terminal, i.e., the user may not touch screen of intelligent terminal when inputting gestures; when the user inputs a gesture in the air, the camera set on the intelligent terminal may capture the gesture images input by the user in the air, and then the gesture images input by the user in the air may be continuously captured during a gesture authentication cycle time, such as 3 seconds or 5 seconds or longer;

for the fingertip binary image extraction processing module 104, the fingertip binary image extraction processing module 104 in the present embodiment is mainly configured to process the captured gesture image of each frame to extract a fingertip binary image corresponding to the frame, wherein the fingertip binary image comprises a black background image block and a white fingertip image block; specifically, for the captured gesture image, the data transmission and the capturing process will be subject to various disturbance, which will cause the captured gesture image to be blurred; so to solve the problem, the present embodiment further includes an image sharpening processing module 108, wherein the image sharpening processing module 108 is mainly configured to perform an image sharpening on the captured gesture image input by the user in the air to highlight the target and contour information for facilitating subsequent extraction of palm contours;

further, in the present embodiment, the fingertip binary image may be extracted in various ways. For example, as a preferred embodiment, referring to FIG. 2, the fingertip binary image extraction processing module 104 in the present embodiment may extract the fingertip binary image by steps of:

Step S1041, performing a skin color segmentation for the gesture image at each frame to obtain a skin-color-segmented image, specifically, for example, a skin color segmentation using the skin color detection algorithm based on YCbCr space may effectively segment the gesture image, which is not repeated here;

Step S1042, extracting a palm binary image from the segmented binary image according to the predetermined threshold, specifically, for the segmented image, the palm binary image may be extracted from the segmented image according to a predetermined threshold, which is not described here again;

Step S1043, extracting a palm contour binary image from the palm binary image; specifically, an edge detection may first be performed on the palm binary image to determine edge points, then redundant edges are removed according to the determined edge points, and discontinuous edges are patched to obtain the palm contour binary image; it should be noted that if the light is poor when capturing gesture images, the extracted palm contours may have various sharp edges, which is not conducive to extracting fingertips; so in order to solve above problem, the present embodiment, for the extracted palm contour binary image, smoothes the palm contour according to a polygon with minimum perimeter of a boundary of the palm contour, wherein the palm contour binary image consists of individual pixel units, as shown in FIG. 3a, and the contour of the palm before smoothing passes through the pixel units; in the present embodiment, through detection of the polygon with minimum perimeter of one or a boundary contour by the pixel unit that the palm contour passes through, such as contour of point j from point a as shown in FIG. 3b, the sharp lines in the palm contour may be smoothed to facilitate subsequent extraction of fingertip binary images;

Step S1044, extracting the fingertip binary image from the palm contour binary image, specifically, extracting in multiple ways, for example, extracting by using Andrew's K-vector fingertip detection method, which will not be repeated here;

further, the virtual password is determined according to the fingertip motion trajectory in the present embodiment, but in actual life, for example, the user may input gestures in a discontinuous way such as pausing the gestures or slightly performing gestures, which may disturb the determination of the virtual password according to the fingertip motion trajectory; for example, FIG. 4a is a motion trajectory formed by continuous motion of the fingertip and FIG. 4b is a motion trajectory formed in case of a pause during the motion of the fingertip, wherein the gesture of fingertips from point a to b is paused, so that if the fingertip trajectory of points a to b is retained on the motion trajectory, the final determination of the virtual password according to the fingertip motion trajectory may be disturbed; similarly, the range of fingertip gestures is small, indicating that the fingertips are slightly moving, and for the trajectory of slightly moving fingertips, the final determination of the virtual password according to the fingertip motion trajectory may be disturbed; to this end, the fingertip binary image validity detection processing module 105 of the present embodiment is configured to, starting from a fingertip binary image at a starting frame, detect a displacement of the fingertip image block at a current frame with respect to the fingertip image block at a previous frame, determine the fingertip image block at the current frame as a perturbed fingertip binary image when the displacement is less than a predetermined threshold while determining the fingertip image block at the current frame as a valid fingertip binary image when the displacement is greater than a predetermined threshold, then continue to detect a displacement of the fingertip image block at a next frame with respect to the fingertip image block at the current frame, determine the fingertip image block at the next frame as the perturbed fingertip binary image when the displacement is less than a predetermined threshold, and then continue to detect the fingertip binary images at subsequent frames until the detection of the fingertip binary image at a last frame is completed, and then remove the perturbed fingertip binary images to finally determine the valid fingertip binary image;

it should be noted that in this step, determining the fingertip binary image corresponding to when the fingertip movement pauses or the fingertip binary image when the fingertip are slightly moving as the perturbed fingertip binary image and not as the valid fingertip binary image may improve the probability and efficiency in subsequent detection of the virtual password, which will not be repeated here;

for the virtual password determination processing module 106, the virtual password determination processing module 106 in the present embodiment is mainly configured to generate a fingertip motion trajectory according to coordinates of each fingertip in a valid fingertip binary image, and determine a virtual password corresponding to the fingertip motion trajectory; specifically, as a specific embodiment, when the motion trajectory of the fingertip is shown in FIG. 3, the virtual password may be determined as "";

for the authentication processing module 107, the authentication processing module 107 is mainly configured to determine whether the virtual password matches a preset virtual password, and pass the authentication if yes to allow to log in the intelligent terminal, specifically, if no, the user will not be allowed to log in the intelligent terminal, then the user may preset and save the password through the intelligent terminal, wherein the preset password may be alphabetic, numeric or text, which is not specifically limited here.

It should be noted that in order to facilitate extraction of the palm contour line, the disclosure further includes performing noise reduction on the fingertip binary image, wherein a BM3D algorithm is used for noise reduction for the fingertip image block to obtain better image effects, and a mean filtering algorithm is used for noise reduction for the background image block to quickly perform noise reduction the background image, so that on the one hand, the calculation amount of noise reduction is reduced, and at the same time better effects of noise reduction for key fingertip image blocks are obtained, which is not repeated here.

The invention claimed is:

1. An intelligent terminal, comprising:
an initiation processing module, configured to initiate the intelligent terminal for startup;
a face authentication processing module, configured to perform a face authentication on a user;
a gesture image capturing processing module, configured to initiate a user gesture authentication after the face authentication, and capture a gesture image input by the user in the air;
a fingertip binary image extraction processing module, configured to process the captured gesture image of each frame to extract a fingertip binary image corresponding to the frame, wherein the fingertip binary image comprises a black background image block and a white fingertip image block;
a fingertip binary image validity detection processing module, configured to, starting from a fingertip binary image at a starting frame, detect a displacement of the fingertip image block at a current frame with respect to the fingertip image block at a previous frame, determine the fingertip image block at the current frame as a perturbed fingertip binary image when the displacement is less than a predetermined threshold, then continue to detect a displacement of the fingertip image block at a next frame with respect to the fingertip image block at the current frame, determine the fingertip image block at the next frame as the perturbed fingertip binary image when the displacement is less than a predetermined threshold, and then continue to detect the fingertip binary images at subsequent frames until the detection of the fingertip binary image at a last frame is completed, and then remove the perturbed fingertip binary images to finally determine a valid fingertip binary image;
a virtual password determination processing module, configured to generate a fingertip motion trajectory according to coordinates of each fingertip in a valid fingertip binary image, and determine a virtual password corresponding to the fingertip motion trajectory;
an authentication processing module, configured to determine whether the virtual password matches a preset virtual password, and pass the authentication if yes to allow logging in the intelligent terminal.

2. The intelligent terminal according to claim 1, wherein the fingertip binary image extraction processing module extracts the fingertip binary image by:
performing a skin color segmentation for the gesture image at each frame to obtain a skin-color-segmented image;
extracting a palm binary image from the skin-color-segmented image according to the predetermined threshold;
extracting a palm contour binary image from the palm binary image;
extracting the fingertip binary image from the palm contour binary image.

3. The intelligent terminal according to claim 2, wherein the fingertip binary image extraction processing module further, for the extracted palm contour binary image, smoothes the palm contour according to a polygon with minimum perimeter of a boundary of the palm contour.

4. The intelligent terminal according to claim 1, further comprising: an image sharpening processing module, configured to perform an image sharpening on the captured gesture image input by the user in the air.

5. The intelligent terminal according to claim 1, wherein the intelligent terminal comprises a smart phone, a computer, a tablet, and an intelligent watch.

* * * * *